United States Patent [19]

Mawhinney

[11] 4,319,245

[45] Mar. 9, 1982

[54] DOPPLER SIGNAL PROCESSING APPARATUS

[75] Inventor: Daniel D. Mawhinney, Livingston, N.J.

[73] Assignee: RCA Corporation, New York, N.Y.

[21] Appl. No.: 154,238

[22] Filed: May 29, 1980

[51] Int. Cl.³ .............................................. G01S 13/60
[52] U.S. Cl. ..................................................... 343/8
[58] Field of Search ............................................ 343/8

[56] References Cited

U.S. PATENT DOCUMENTS

| | | | |
|---|---|---|---|
| 3,011,166 | 11/1961 | Fell et al. ............................ | 343/8 X |
| 3,171,118 | 2/1965 | Chambers et al. .................. | 343/8 X |
| 4,008,473 | 2/1977 | Hinachi et al. ..................... | 343/8 X |
| 4,016,568 | 4/1977 | Makimoto et al. .................. | 343/8 |

Primary Examiner—Malcolm F. Hubler

Attorney, Agent, or Firm—Samuel Cohen; Robert L. Troike; Raymond E. Smiley

[57] ABSTRACT

A doppler type speed sensor produces a doppler signal having a spectrum of frequencies including a frequency of peak amplitude corresponding to the actual speed of an object. The frequencies are supplied to a narrowband voltage tunable filter, the frequency bandwidth of which is continuously adjusted by a periodically reoccurring sweep signal applied thereto. The output of the filter is coupled to a peak detecting circuit which produces a pulse when the maximum amplitude signal is received thereat. The sweep signal and pulse are applied to the inputs of a sample-and-hold circuit to cause the sample-and-hold circuit to hold and produce a signal corresponding to the value of the peak frequency and therefore the speed of the object.

9 Claims, 1 Drawing Figure

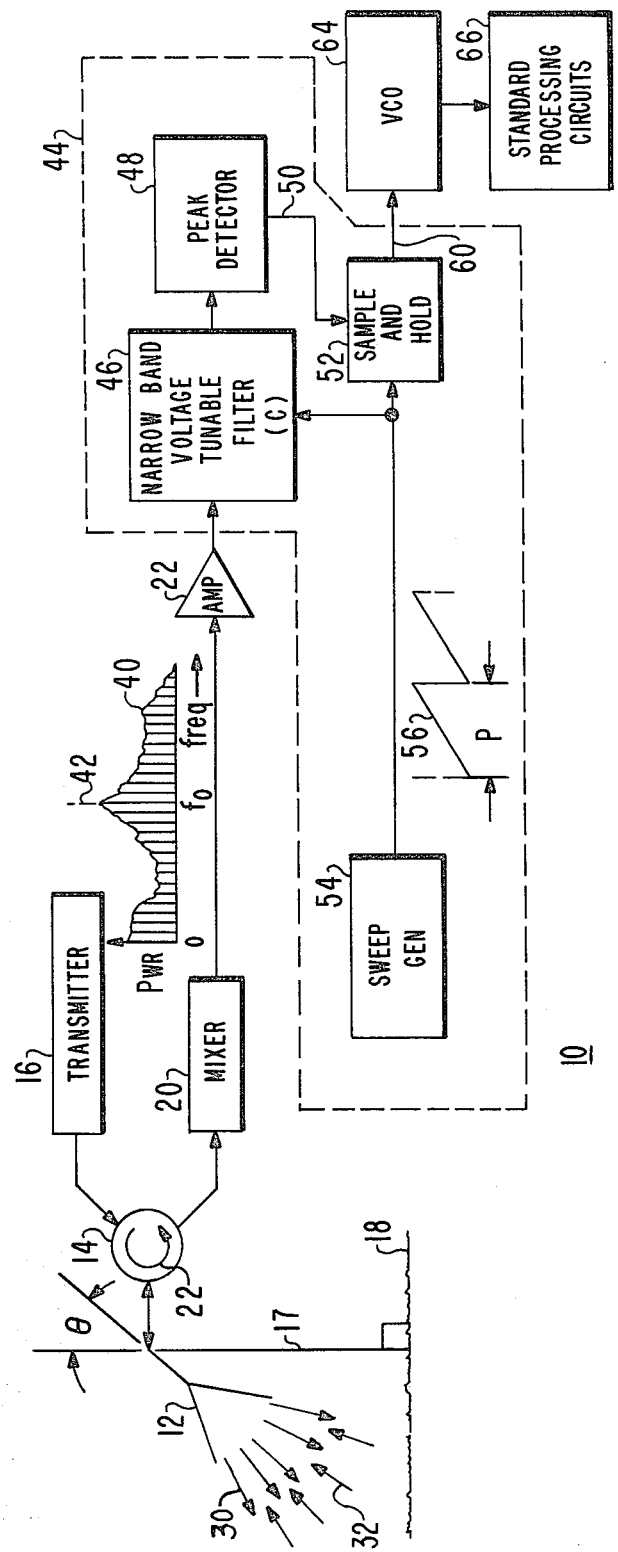

DOPPLER SIGNAL PROCESSING APPARATUS

This invention relates to vehicle speed measuring doppler radar and more particularly to apparatus for extracting a speed indicating signal from the doppler radar signal.

Doppler radar is widely used to measure vehicle ground speed. For example it is used to measure the police vehicle speed in so-called moving type speed radars. It is also used to determine locomotive speed along the railroad tracks. In such doppler speed measuring devices, a radar antenna transmits a continuous beam of radio frequency (RF) signal, which is, in theory, an infinitely narrow beam, to stationary objects in front of the antenna as the vehicle moves. The beam is reflected back to the radar from the objects and a single doppler frequency signal at a given frequency value is produced in conventional manner. The value represents the vehicle speed and only changes as vehicle speed changes.

In practice, the beam transmitted from the radar antenna is relatively wide, such as about 20 degrees. As a result, the ground and other targets to which the beam is aimed are illuminated over a wide area. Therefore, the return signal is produced by the sum of many component angles, not just the incident angle and the doppler signal frequency spectrum is composed of a continuum of frequencies with an amplitude peak at the frequency corresponding to the incident angle of the radiated beam. Because the peak frequency is usually not too well defined, particularly at higher vehicle speeds, the accepted signal processing technique for extracting the speed determination signal from the doppler signal involves reading the average frequency produced by the radar equipment and from that determining the speed. Such a technique is subject to considerable error with variation in amplifier frequency response and the character of the RF signal illuminated targets by which the vehicle passes which thus alter and often distort the received spectrum. The average signal is usually determined after signal modification apparatus alters the raw return signal to deemphasize certain frequency regions and emphasize others in a pattern which for the majority of cases, has been found through trial and error to produce accurate results. In some cases, however, utilizing the weighted average signal results in an erroneous speed determination.

In a locomotive, the speed error normally manifests itself as an indication that the locomotive is going slower than in fact is the case. In the locomotive type application, a conventional speed sensor is also employed which makes a speed determination based on wheel revolutions as is done with an ordinary automobile speedometer. If the speed measured by the radar is below that measured by the conventional locomotive speedometer, other onboard equipment determines that the locomotive wheels are slipping and causes the throttle of the locomotive to be retarded thus lowering the speed of the locomotive. Where faulty radar speed readings occur due to the above-mentioned broadband frequency spectrum of return signal, the throttle is caused to be retarded even further such that ultimately, the locomotive may come to a complete stop even though there is no wheel slippage at all.

A doppler type speed sensor according to one embodiment of the present invention, includes a conventional equipment to produce a doppler first signal which has a spectrum of frequency and has a frequency of peak amplitude indicative of speed of the sensor. The first signal and a control second signal of varying amplitude value are applied to a means producing as a function of the amplitude value of the control signal, a third signal representing in succession the amplitudes of various frequencies in the spectrum. A peak detecting means is responsive to the signal from the filter for producing a fourth signal indicative of the detection of peak amplitude of the doppler signal. A means is responsive to the second signal and fourth signal for storing the value of the signal which stored signal corresponds to the speed of the vehicle.

In the drawing:

The sole FIGURE is a doppler type speed measuring system incorporating the peak frequency determining network in accordance with the invention.

Referring now to the sole FIGURE, a doppler type speed measuring system 10 includes a receiving-transmitting antenna 12 of conventional design which is directed at a known angle relative to some surface to which the radar signals can be beamed to be reflected back therefrom. In a locomotive speed sensing radar it has been found best to position antenna 12 at an angle $\theta$ of 45° relative to a normal 17 to the ground surface 18. The antenna 12 is located between the locomotive wheels (not shown). Antenna 12 is connected via a transmission line to a circulator 14. Circulator 14 in turn receives continuous RF signal from a transmitter 16 of conventional design which passes signals in the direction of arrow 22 to antenna 12. Circulator 14 is also coupled to a subtractive mixer 20 also of conventional design. Mixer 20 receives signals both from antenna 12 passed by circulator 14 in the direction of arrow 22 and signals leaked from transmitter 14 in the reverse direction, that is, in the direction opposite that of arrow 22. Mixer 20 produces a doppler signal corresponding to the speed of the system 10 relative to fixed objects. The signal produced by mixer 20 is amplified by a conventional amplifier 22. All the circuitry described thus far is well known to those skilled in the art.

Ideally, though not in practice, antenna 12 directs an infinitely thin beam of radio frequency signal to ground surface 18. In practice, however, the antenna transmits a beam having a finite angular width and thus over an angular sector as indicated by various arrows as exemplified by arrow 30. Therefore, resulting return signals come from various points along ground surface 18 as indicated by various arrows as exemplified by arrow 32 and may, in fact, include return signals from bridge supports, railroad ties and other objects (not illustrated). Therefore, the resulting signal from mixer 20 and thus from amplifier 22, is as illustrated in waveform 40. Waveform 40 is a plot of power (PWR) on the vertical axis verses doppler frequency on the horizontal axis. The waveform has a spectrum of frequencies ranging all the way from zero frequency to frequencies higher than the frequency $f_o$ associated with the highest power amplitude. Frequency $f_o$ known colloquially as the "peak frequency" is the doppler frequency associated with the reflected signal resulting from the portion of the beam transmitted by antenna 12 at angle $\theta$ relative to normal 17. Frequency $f_o$ is indicated by line 42 waveform 40.

In accordance with the invention, a peak frequency determining apparatus comprises those elements located within dashed block 44. In particular amplifier 22 is connected to a narrowband voltage tunable filter 46. Such voltage tunable filters are commercially available and usually comprise operational amplifiers having a bandwidth determined by the voltage applied to a variable capacitance diode (varactor). At the commonly used transmitter frequency of 10,525 MHz with antenna 12 mounted at angle $\theta=45°$, the doppler frequency is approximately 22 Hz/mph. Therefore a bandwidth of 11 Hz will resolve the velocity to about ½ mph.

Filter 46 is coupled to a peak detecting circuit 48 which determines the peak amplitude signal presented thereto and produces a pulse on line 50 indicating when that peak is reached. (It will be understood that waveform 40 has only one peak). The line 50 from peak detecting circuit 48 is coupled to the "hold command" or trigger input of a sample-and-hold circuit 52 of conventional design. A sweep generator 54 is coupled to the control input (C) of filter 46 and to the signal input of sample-and-hold circuit 52. Sweep generator 54 typically produces a sawtooth waveform, as illustrated in waveform 56, of amplitude sufficient to drive filter 46 through the range of frequencies expected to be produced by amplifier 22 and with a period P which is sufficiently low such that a desired number of samples are taken for a unit time. For example, P may be on the order of 0.1 seconds. Sample-and-hold circuit 52 produces on output line 60 a held signal of given level until a pulse is received from peak detector 48. The signal then present from sweep generator 54 is held and presented on line 60.

In one particular application, the circuit of FIG. 1, must replace a prior radar locomotive speed sensor which produced a frequency proportional to the speed of the locomotive. Therefore, the present unit, in order to produce such signals, has the sample-and-hold circuit 52 coupled to a voltage controlled oscillator 64. The voltage controlled oscillator, in turn, may be coupled to other processing circuits 66 which convert the frequency produced by VCO 64 back into a signal, the amplitude of which is a function of the speed of the locomotive. In other applications, sample-and-hold circuit 52 produces on its output line 60 a signal, the amplitude of which is a measure of the peak frequency indicated by line 42 in waveform 40 which is a direct indication of the speed of the locomotive. Therefore, line 60 may be simply coupled to a volt meter calibrated in terms of speed.

Operation of the circuit of the FIGURE is as follows. Transmitter 16 transmits a continuous radio frequency signal via circulator 14 to antenna 12. The RF signal is broadcasted thereby in a given direction relative to known stationary targets such as an angle of 45° relative to a normal 17 of ground surface 18. Signals are reflected back from the ground surface to antenna 12 and thence through circulator 14 in the direction of arrow 22 to mixer 20 where they are subtractively mixed with the leaked signal produced by transmitter 16. The resulting signal which is applied to amplifier 22 is a doppler signal indicative of having a peak frequency which is indicative of speed of movement of system 10 along the ground surface 18. As mentioned previously, ideally the signal would be at only one frequency, that is the frequency indicated by line 42 in waveform 40.

Sweep generator 54 is simultaneously and continuously producing a waveform such as that illustrated in waveform 56 which waveform drives tunable filter 46 to pass at any point in time those frequencies related to the voltage applied at the C terminal of filter 46. At the time that generator 54 produces a voltage which causes filter 46 to produce peak frequency $f_o$, peak detector 48 will determine that this peak frequency has been reached. When the peak detector 48 determines that a peak signal has been produced by filter 46, it produces a pulse on line 50 which causes sample-and-hold circuit 52 to release any signal level which it was previously storing and to store the voltage level then being produced by sweep generator 54.

It will be realized by those skilled in the art that all peak detectors require a certain amount of time beyond the receiving peak signal to determine that, in fact, a peak signal has been received. If this time becomes sufficiently long relative to the values of other parameters in the system, a small delay may be inserted as necessary between sweep generator 54 and sample-and-hold circuit 52 such that a voltage corresponding to the actual peak frequency $f_o$ is present at sample-and-hold 52 when peak detector 48 produces a pulse indicative of a peak voltage being reached. Therefore, the voltage produced on line 60 of sample-and-hold 52 is a voltage which is indicative of the peak frequency $f_o$ of waveform 40 and therefore a voltage which is indicative of the speed of the apparatus of FIG. 1 over ground surface 18. If desired, the voltage produced by sample-and-hold circuit 52 may be converted by a voltage controlled oscillator 54 into an equivalent frequency which can then be used by standard processing circuit 66 to display or otherwise process speed information.

It will be understood that system 10, as described, may be moving relative to stationary objects such as 18. Alternatively, the system may be fixed while an object the speed of which is to be determined is moving.

I claim:

1. In a doppler type speed sensor which includes means for transmitting a continuous frequency signal into the atmosphere and receiving resulting reflected return signals, a mixer for mixing the transmitted and return signals to produce a doppler frequency signal indicative of the relative speed between said sensor and objects from which the transmitted signal is returned and wherein the doppler frequency signal comprises a spectrum of frequencies of various amplitudes and having a frequency at a peak amplitude representing said speed, the combination comprising:

means producing a control signal of an amplitude value varying with time;

means responsive to said doppler frequency signal and to said control signal for producing as a function of the amplitude value of said control signal an output signal corresponding to the amplitudes of successive frequencies in said frequency spectrum;

means responsive to said output signal for producing a pulse corresponding to the production of said peak amplitude; and means responsive to said pulse and to the value of said control signal for storing said value whereby said stored value corresponds to said frequency of said peak amplitude and said speed.

2. The combination as set forth in claim 1, wherein said means producing said control signal comprises means producing a sawtooth waveform.

3. The combination as set forth in claim 1, wherein said means producing said output signal comprises a tunable narrowband filter.

4. The combination as set forth in claim 1, wherein said means producing said pulse is a peak detecting circuit.

5. A vehicle speed sensing system for determining the relative speed between a vehicle and given objects, comprises in combination:
 means producing a radio frequency signal of fixed frequency;
 means for transmitting said radio frequency signal into the atmosphere toward said objects and receiving a reflected return signal from said objects;
 means for subtractively mixing said transmitted and reflected signals to produce thereby a doppler first signal having a spectrum of frequencies of various amplitudes including a frequency of amplitude greater than the amplitude of the other frequencies and corresponding to said speed;
 means producing a second signal of an amplitude value which varies with time;
 means responsive to said doppler first signal and to said second signal for producing as a function of time, a third signal corresponding to the amplitude of successive frequencies of said doppler signal;
 means responsive to said third signal for producing a fourth signal indicative of the production of said third signal corresponding to said greater amplitude; and
 means responsive to said fourth signal and said second signal for storing the value of said second signal, said stored signal corresponding to said speed.

6. The combination as set forth in claim 5, wherein said means producing said second signal comprises means producing a sawtooth waveform.

7. The combination as set forth in claim 5, wherein said means producing said third signal, comprises a tunable narrowband filter.

8. The combination as set forth in claim 5, wherein said means producing said fourth signal is a peak detecting circuit.

9. The combination as set forth in claim 1 or 5, wherein said storing means comprises a sample-and-hold circuit.

* * * * *